US 11,764,646 B2

United States Patent
Wang et al.

(10) Patent No.: US 11,764,646 B2
(45) Date of Patent: Sep. 19, 2023

(54) FLUID PUMP

(71) Applicant: Johnson Electric International AG, Murten (CH)

(72) Inventors: Xiaoming Wang, Shenzhen (CN); Long Yu, Hong Kong (CN); Pinghua Tang, Shenzhen (CN); Yi Jing, Shenzhen (CN); Ruifeng Qin, Hong Kong (CN); Guoyuan Zou, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 68 days.

(21) Appl. No.: 17/478,103

(22) Filed: Sep. 17, 2021

(65) Prior Publication Data
US 2022/0006360 A1     Jan. 6, 2022

Related U.S. Application Data

(63) Continuation of application No. PCT/CN2020/079671, filed on Mar. 17, 2020.

(30) Foreign Application Priority Data

Mar. 22, 2019   (CN) .......................... 201910220679.8

(51) Int. Cl.
*H02K 11/01*   (2016.01)
*H02K 5/08*    (2006.01)
(Continued)

(52) U.S. Cl.
CPC ......... *H02K 11/0141* (2020.08); *F04D 13/06* (2013.01); *H02K 5/08* (2013.01); *H02K 11/40* (2016.01)

(58) Field of Classification Search
CPC ...... H02K 11/0141; H02K 5/08; H02K 11/40; H02K 5/128; H02K 5/225; H02K 2211/03;
(Continued)

(56) References Cited

U.S. PATENT DOCUMENTS 4,087,708 A * 5/1978 Laing .................. H02K 5/1282
310/64
4,226,574 A * 10/1980 Villette ................ F04D 13/025
310/104

(Continued)

FOREIGN PATENT DOCUMENTS

CN       101225827 A       7/2008
CN       105186725 A       12/2015
(Continued)

OTHER PUBLICATIONS

PCT/CN2020/079671, English Translation of the International Search Report, dated Jun. 17, 2020 by the China National Intellectual Property Administration (ISA/CN).

*Primary Examiner* — Dominick L Plakkoottam
(74) *Attorney, Agent, or Firm* — Aird & McBurney LP

(57) ABSTRACT

A fluid pump includes a pump casing, a motor connected to the pump casing, and an impeller driven by the motor. The motor includes a housing and a stator arranged in the casing. The housing is made of a non-magnetic material. The stator includes a stator iron core and a plurality of windings wound on the stator iron core. The motor further includes a sleeve having a cylindrical main body and a flange extending radially outwards from one end of the main body and fixed to the housing. An annular space is jointly bounded by the sleeve and the housing to accommodate the stator. A part of inner surface of the housing and a part of bottom surface of
(Continued)

the flange facing the annular space are coated with a metal coating for electromagnetic wave shielding.

8 Claims, 6 Drawing Sheets

(51) Int. Cl.
*H02K 11/40* (2016.01)
*F04D 13/06* (2006.01)

(58) Field of Classification Search
CPC .......... H02K 11/33; H02K 3/42; F04D 13/06; F04D 13/0626; F04D 29/426; F04D 13/0606; F05D 2230/313; F05D 2230/90; F05D 2300/10
See application file for complete search history.

(56) References Cited

U.S. PATENT DOCUMENTS

| | | | | |
|---|---|---|---|---|
| 6,232,684 | B1 * | 5/2001 | Haag | H02K 11/02 |
| | | | | 292/201 |
| 2005/0214135 | A1 * | 9/2005 | Shibuya | F04D 29/0465 |
| | | | | 417/357 |
| 2016/0344250 | A1 * | 11/2016 | Jang | H02K 5/08 |
| 2017/0037855 | A1 * | 2/2017 | Yin | F04D 13/06 |
| 2018/0366697 | A1 * | 12/2018 | Elfering | H01M 50/247 |
| 2018/0372221 | A1 | 12/2018 | Wilkins | |

FOREIGN PATENT DOCUMENTS

| | | | | |
|---|---|---|---|---|
| CN | 105220111 | A * | 1/2016 | B22C 9/061 |
| CN | 208226711 | U * | 12/2018 | H02K 15/00 |
| CN | 208285181 | U | 12/2018 | |
| CN | 208369359 | U | 1/2019 | |
| CN | 109428414 | A * | 3/2019 | H01F 7/021 |

* cited by examiner

FLUID PUMP

CROSS REFERENCE TO RELATED APPLICATIONS

This non-provisional patent application is continuation application of PCT Application No. PCT/CN2020/079671, filed with the Chinese Patent Office on Mar. 17, 2020, which claims priority to Chinese Patent Application No. 201910220679.8, filed on Mar. 22, 2019, all of which are incorporated herein by reference in their entirety.

FIELD OF THE INVENTION

This invention relates to a fluid pump and in particular to a coolant pump for automobile.

BACKGROUND OF THE INVENTION

The working principle of a common coolant pump such as a water pump is: an impeller is driven by a motor to rotate at a high speed, and liquid, i.e. water in the pump body is disturbed by the impeller and is discharged from the outlet under the action of centrifugal force. Then, a low pressure area is formed at the center of the impeller to urge outside liquid to enter the pump via an inlet. Therefore, a circulation of liquid is achieved by sucking the liquid to the pump body via the inlet and discharging the liquid from the outlet to. An existing coolant pump has a motor including a casing, a stator arranged in the casing, and a rotor rotatably installed in the stator. For cost considerations, the casing of the motor is usually made of plastic. In use, the stator windings always cause electromagnetic interference (EMI) around the motor, which affects the reliability and stability of the pump.

SUMMARY OF THE INVENTION

Thus, the present invention tends to provide a fluid pump that can solve the above-mentioned problems.

Accordingly, in one aspect thereof, the present invention provides a fluid pump comprising a pump casing, a motor connected to the pump casing, and an impeller driven by the motor. The motor includes a housing and a stator arranged in the casing. The housing is made of a non-magnetic material. The stator includes a stator iron core and a plurality of windings wound on the stator iron core. The motor further includes a sleeve having a cylindrical main body and a flange extending radially outwards from one end of the main body and fixed to the housing. An annular space is jointly bounded by the sleeve and the housing to accommodate the stator. A part of inner surface of the housing and a part of bottom surface of the flange facing the annular space are coated with a metal coating for electromagnetic wave shielding.

Preferably, the main body of the sleeve is surrounded by the stator, and a part of a side wall of the main body facing the annular space is partially coated with the metal coating.

Preferably, the housing includes a cylindrical side wall and a partition wall extending inwards from the side wall to divide a space inside the housing to a first accommodating chamber and a second accommodating chamber, the stator and the sleeve are both received in the first accommodating chamber, and an inner surface of the side wall of the housing and an end surface of the partition wall facing the annular space are coated with the metal coating.

Preferably, the partition wall is provided with an avoidance hole, a hole wall bounding the avoidance hole is covered by the metal coating Preferably, the motor further comprises a terminal arranged in the housing, and the terminal is used to ground the stator core.

Preferably, the casing is made of plastic, and the metal coating is formed by physical vapor deposition Preferably, the metal coating comprises a copper layer.

Preferably, the metal coating further comprises two nickel layers respectively located on opposite sides of the copper layer.

Preferably, one the one of the nickel layers is directly laminated onto surfaces of the housing or the sleeve, the copper layer is laminated onto said one of the nickel layers, the other nickel layer is laminated at the top of metal coating, the metal coating has at least one silver layer laminated between the copper layer and the nickel layer at the top of the metal coating.

Preferably, the thickness of the metal layer is range between 0.5 to 1.5 um.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
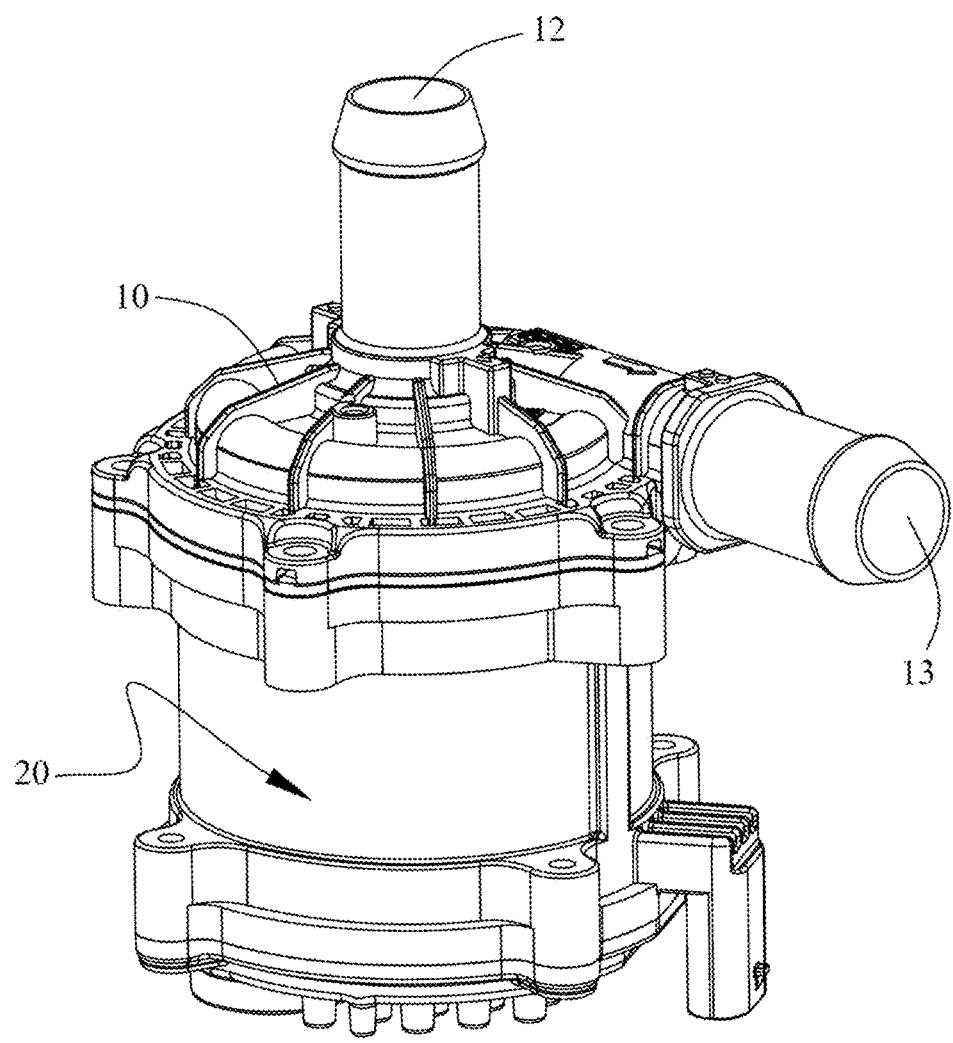
FIG. 1 is a perspective view of a fluid pump according to an embodiment of the present invention.

Referring to FIGS. 1 to 4, a fluid pump according to an embodiment of the present invention includes a pump casing 10, a motor 20 connected to the pump casing 10, and a impeller 30 driven by the motor 20. The motor 20 includes a cylindrical housing 40, and a stator 50, a sleeve 60 and a rotor 70 arranged in the housing 40 sequentially from the outside to the inside in a radial direction.

In this embodiment, the sleeve 60 is almost in the shape of a cylinder with one end open, and fixedly connected to the housing 40. An annular space 400 is jointly bounded by the sleeve 60 and the housing 40 to accommodate the stator 50. The stator 50 is ring-shaped and includes a stator core 51, upper and lower bobbins 52 and 53 that collectively enclose the stator core 51, and windings 54 wound on the upper and lower bobbins 52 and 53. A receiving chamber 600 is defined inside the sleeve 60 for receiving the rotor 70. The rotor 70 includes a rotor core 71 and some permanent magnets (not shown) fixed in the rotor core 71. A top end of the sleeve 60 and the pump casing 10 jointly enclose a pump chamber 11 for receiving the impeller 30. In this embodiment, the impeller 30 and the rotor 70 are integrally connected by a supporting body 72. A positioning shaft 601 extend along a center of the sleeve 60. One end of the positioning shaft 601 is fixedly connected to the bottom of the sleeve 60, and the other end thereof passes through the supporting body 72 to be fixed to the pump casing 10. Preferably, the positioning shaft 601 and the sleeve 60 are integrally connected by overmolding. The positioning shaft 601 is connected to supporting body 72, and thereby supporting the impeller and the rotor, with two rotatable support members, such as two bearings 73 respectively adjacent to both ends of the positioning shaft 601. Therefore, the rotor 70 can rotate relative to the stator 50 and the positioning shaft 601, and the impeller 30 can also rotate synchronously with the rotor 70. When in use, the rotor 70 drives the supporting body 72 and the impeller 30 to rotate relative to the stator 50, and the positioning shaft 601 under the action the magnetic field of the stator 50. The liquid outside the pump can enter the pump via an inlet 12 of the pump casing 10, and then is discharged out of the pump casing 10 via an outlet 13.

In present embodiment, the housing 40 is made of a non-magnetic material, and includes a cylindrical side wall 41 and a partition wall 42 extending inwards from and perpendicular to the side wall 41 in a radial direction. The partition wall 42 divides a space inside the housing 40 to a first accommodating chamber 43 and a second accommodating chamber 44. The stator 50, the sleeve 60 and the rotor 70 are all received in the first accommodating chamber 43. The sleeve 60 includes a cylindrical main body 61 and a flange 62 extending radially outward from the open end of the main body 61. The flange 62 is fixed to an top end of the housing 40. The main body 61 is surrounded by the stator 50. In other words, in present embodiment, the annular space 400 is bounded by a part of side wall 41 of the housing 40 above the partition wall 42, the flange 62 of the sleeve 60, the side wall of the main body 61 of the sleeve 60, and the partition wall 42 of the housing 40. An inner surface of the side wall 41 facing the annular chamber 400, a top surface of the partition wall 42 facing the annular chamber 400, and a bottom surface of the flange 62 facing the annular space 400 are all coated with a metal coating for electromagnetic wave shielding. Therefore, a shielding space is formed to enclose the stator 50 from upper, lower, and outer periphery thereof to prevent magnetic leakage after the winding 54 of the stator 50 is energized, which effectively improves an electromagnetic shielding effect of the pump and reduces an undesirable effect around the pump. Preferably, the housing 40 is made of plastic coated with the metal coating in present embodiment, to effectively improve the electromagnetic shielding effect of the pump, as well as reduce the weight of the pump and the manufacturing cost.

Preferably, the top surface of the partition wall 42 of the housing 40 is totally coated with the metal coating to further improve the electromagnetic shielding effect. In Preferably, the top surface of the partition wall 42 of the housing 40 is totally coated with the metal coating to further improve the electromagnetic shielding effect. In some embodiments, the partition wall 42 is provided with an avoidance hole 420, which can be used to receive the hub 610 of the main body 61 (the hub 610 can improve the fixing strength of the positioning shaft 601). In other embodiments, the avoidance hole 420 can also be used to avoid interference of components such as capacitors on the circuit board and the partition wall 42. In order to further improve the electromagnetic shielding effect, the hole wall 421 bounding the avoidance hole 420 may also cover the metal coating. More preferably, the side wall of the main body 61 facing the annular space 400 is also at least partially coated with the metal coating. In some embodiments, only the upper half of the main body 61 may be coated with the metal coating, so as to form a continuous metal coating with the flange 62 to ensure the electromagnetic shielding effect and reduce the manufacturing cost. In other embodiments, the side wall of the main body 61 facing the annular chamber 400, and even the entire outer wall of the bottom of the main body 61 can also be coated with the metal coating, so as to further improve the resistance to the winding 54 of the stator 50. Shielding effect.

In this embodiment, an arc-shaped support portion 422 is formed inside the housing 40 around the partition wall 42. The support portion 422 directly abuts against the lower bobbin 53 of the stator 50 to support the stator 50. The flange 62 of the sleeve 60 is provided with a plurality of positioning tabs 620 evenly distributed along a circumferential direction. Each of the positioning tabs 620 extends downward in the axial direction from an end face of the flange 62, and an insertion hole 621. A plurality of insertion pins 520 extends upwards from the end of the upper bobbin 52 of the stator 50 that faces the flange 62. The insertion pins 520 is correspondingly engaged into the insertion holes 621 of the positioning tabs 620 to enable a quick alignment and connection of the sleeve 60 and the stator 50, and to position the stator 50 in the axial direction together with supporting portion 422. In present embodiment, the stator core 51 includes six poles. Correspondingly, the stator 50 includes 6 sets of windings 54. Each of the insertion pins 520 are preferably arranged between adjacent windings 54. In this embodiment, the number of the insertion pins 520 is also 6. Preferably, the outer wall of the main body 61 of the sleeve 60 is further provided with a plurality of ridges 612 evenly distributed in the circumferential direction. The ridges 612 are correspondingly engaged between the adjacent windings 54 to fix the stator in the circumferential direction. 50. In present embodiment, the number of ridges 612 is also 6. It can be understood that, in other embodiments, according to the number of magnetic poles of the stator core 51, the number of the ridges 612, the insertion pin 520, etc. are also changed accordingly. It can also be understood that in other embodiments, other fixing structures can also be used to fix the stator 50 in the axial and/or circumferential direction.

Preferably, the flange 62 is also provided with an clamping rim 621 surrounding the plurality of positioning tabs 620. The end of the housing 40 facing the flange 62 defines a clamping groove 410. The clamping rim 621 is adapt to be embedded in the clamping groove 410, so as to facilitate positioning of the sleeve 60 to the housing 40. In order to improve the tightness of the connection between the two, a sealing ring 411 can be embedded between the clamping rim 621 and the clamping groove 410.

More preferably, the flange 62 is also provided with two positioning pins 622 on both circumferential sides of each positioning tab 620, and all the positioning pins 622 are distributed in the circumferential direction to form an annular gap 623 between the clamping rim 621. A lip 412 at a radial inner side of the clamping groove 410 of the housing 40 can be fitted into the receiving gap 623. Preferably, a radial inner side of the lip 412 abuts against the positioning pins 622, and a radial outer side of the lip 412 abuts against the clamping rim 621, so as to further improve the assembly reliability of the sleeve 60 and the housing 40.

Preferably, an end of the lip 412 of the shell 40 is also coated with the metal coating, that is, the metal coating on the housing 40 continuously extends from the inner surface of the side wall 41 to the end of the lip 412. More preferably, the metal coating is covered on the flange 62 extends from its connection with the main body 61 to the radially inner side of the clamping rim 621, thereby forming seamless shielding space between the housing 40 and the flange 62 to further improve the electromagnetic shielding effect.

It can be understood that, in other embodiments, the housing 40 and the flange 62 of the sleeve 60 may be connected in alternative way, other than the arrangement in present embodiment, that is the clamping groove 410 with the lip 412 provided in the housing 40, and the clamping rim 621 and the receiving gap 623 formed the flange 62, Correspondingly, the region of the housing 40 and the flange 62 coated by the metal coating may be changed accordingly to form a seamless shield space.

Figure 6:
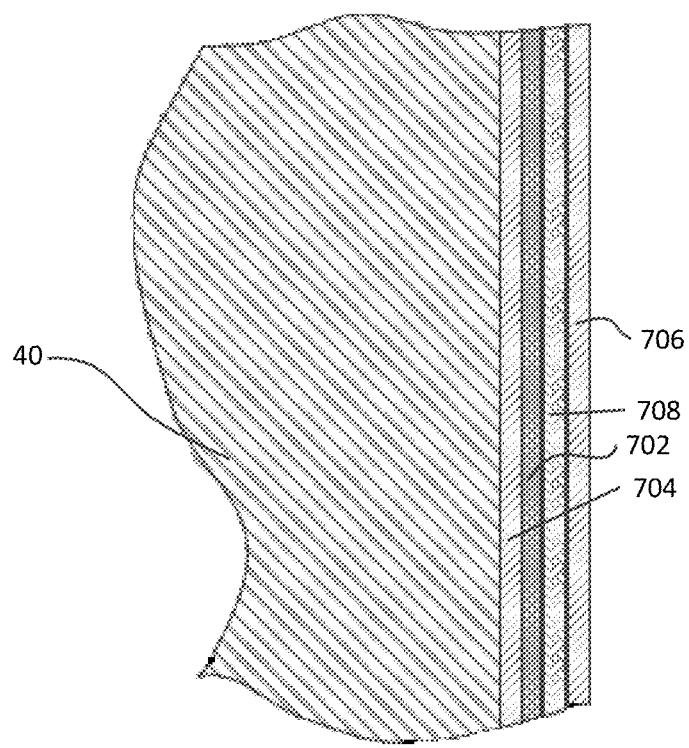
FIG. 6 is a cross-sectional view of a metal coating attached to a housing of a fluid pump according to an embodiment of the present invention.

Referring to FIG. 6, in the present embodiment, the thickness of the metal coating may be 0.5-1.5 um, preferably, 1 um. Preferably, the metal coating 700 includes a copper layer 702. More preferably, the metal coating 700 further includes two nickel layers 704, 706 respectively located on opposite sides of the copper layer 702. Specifically, when the metal coating 700 is attached to the housing 40 or the sleeve 60, one of the nickel layers 704 is directly laminated onto surfaces of the housing 40 or the sleeve 60, thereby improving adhesion of the metal coating 700. Then, the copper layer 702 is laminated onto the nickel layer 704. Finally, the other one layer 706 of nickel is laminated onto the copper layer 702 to protect the copper layer 702 from oxidation. Preferably, the metal coating 700 has at least one silver layer 708 laminated between the copper layer 702 and the nickel layer 706 on the top of the metal coating 700. In other words, said at least one silver layer 708 is farther away from the surface, to which the metal coating is adhered, than the copper layer 702, so as to further improve the electromagnetic shielding effect. Preferably, the metal coating 700 is formed by physical vapor deposition (PVD). In other embodiments, the number and arrangement of the nickel layer and the silver layer can be adjusted as needed. Understandably, the metal coating may formed with other materials with electromagnetic shielding effects.

Figure 2:
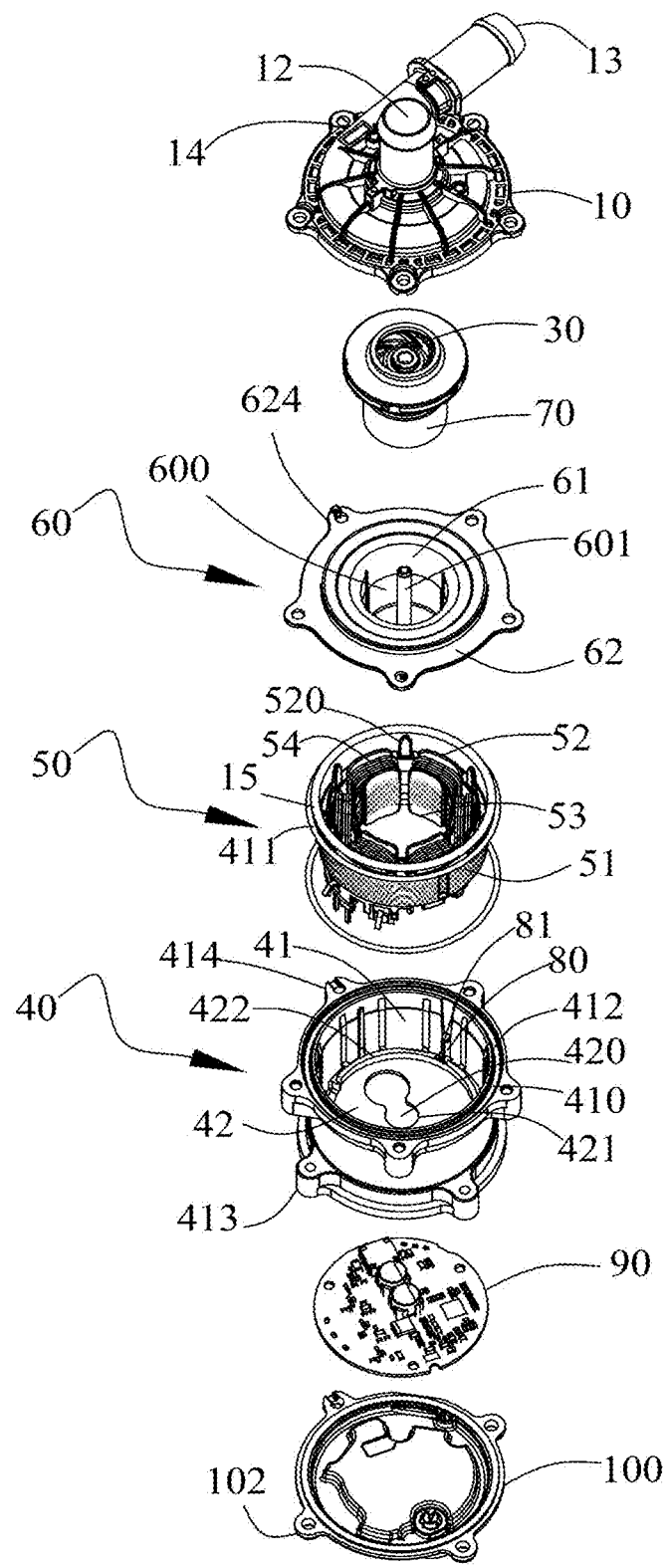
FIGS. 2 and 3 are exploded views of the fluid pump shown in FIG. 1 with different perspectives.
Figure 3:
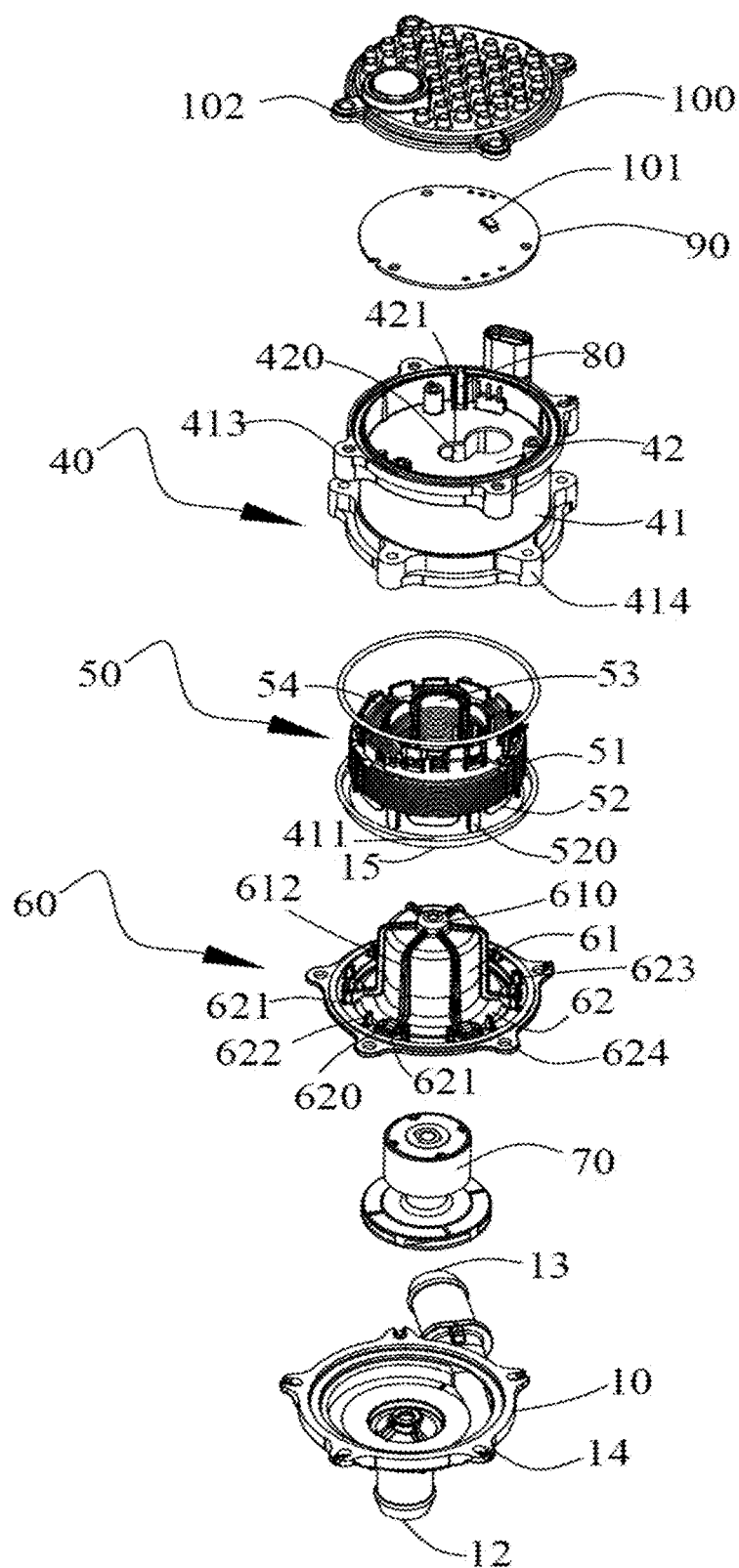
Figure 4:
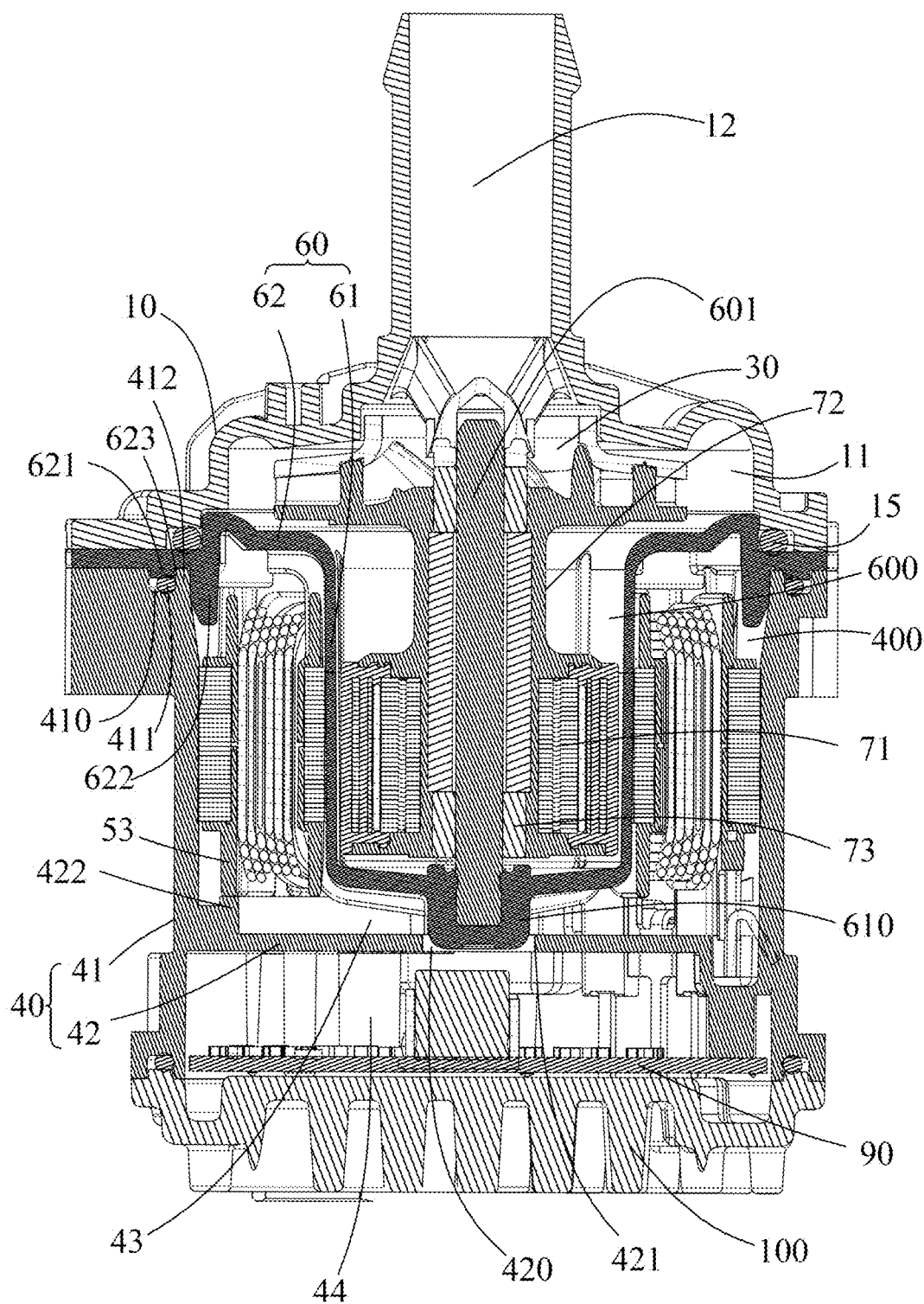
FIGS. 4 and 5 are cross-sectional views of the fluid pump shown in FIG. 1 with different perspectives.
Figure 5:
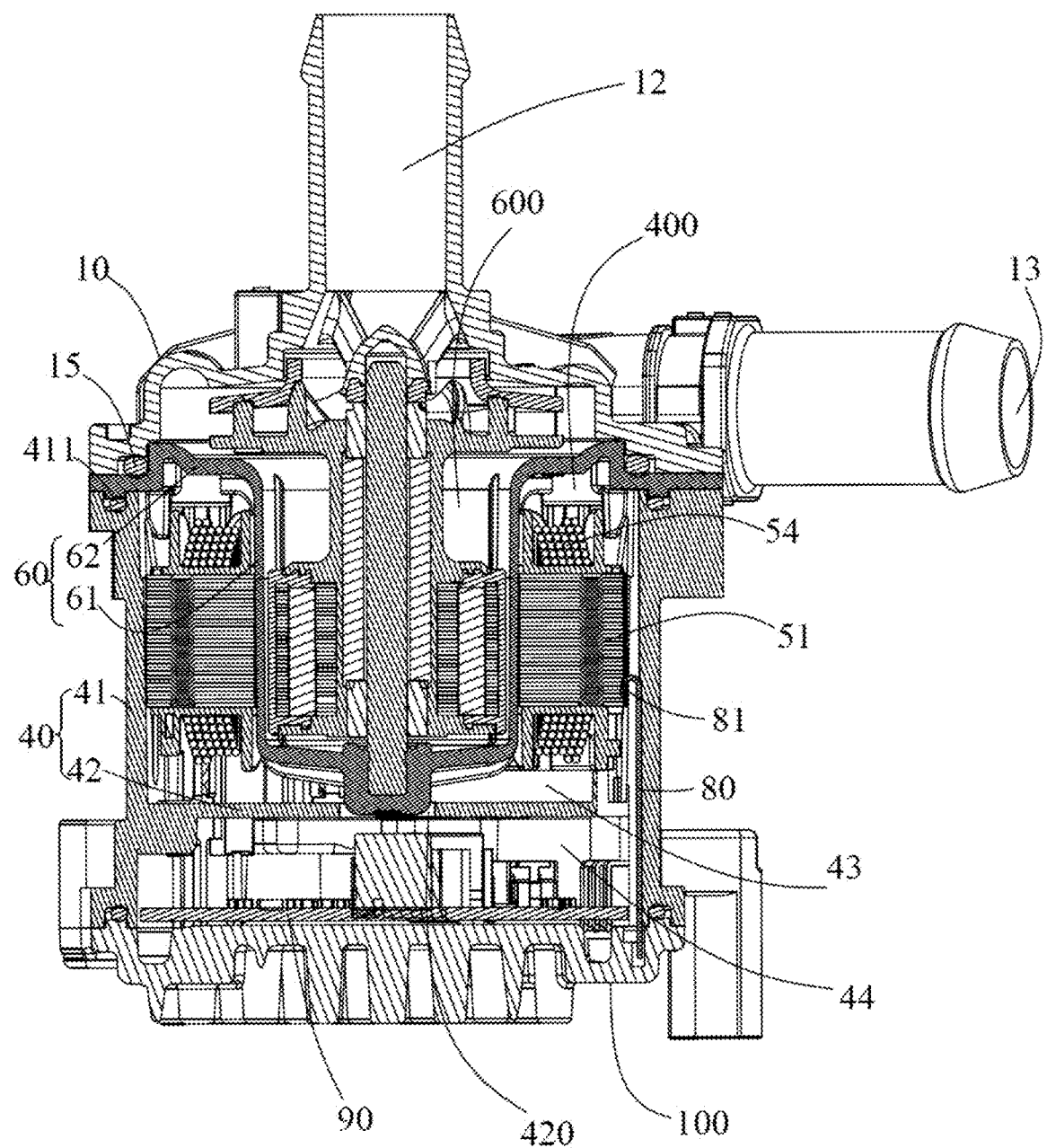

Referring also to FIGS. 2, 3, and 5, in present embodiment, the motor 20 further includes a terminal 80 integrally connected with the housing 40, and a circuit board 90 arranged in the second accommodating chamber 44 of the housing 40, and an end cover 100 supporting circuit board 90.

More preferably, the terminal 80 is integrally connected with the housing 40 by overmolding. The terminal 80 can be used to ground the stator core 51. Specifically, one end of the terminal 80 is located in the first accommodating chamber 43 of the housing 40 and forms a bent portion 81. In assembly, the bent portion 81 is sandwiched between the side wall 41 of the housing 40 and the stator core 51. The terminal 80 is electrically connected to the metal coating on the side wall 41 and the stator core 51. The other end of the terminal 80 extends through the partition wall 42 and the second accommodating chamber 44 and contacts with the end cover 100. In present embodiment, the end over 100 is made of aluminum. The end cover 100 is then connected to the circuit board 90 for grounding via a spring 101 (shown in FIG. 3), or the like. It can be understood that the stator core 51 and the metal coating on the side wall 41 are grounded through the terminal, which further improves the electromagnetic shielding effect.

The end cover 100 is fixedly to the housing 40. Specifically, a number of lower fixing posts 413 with through holes are formed on the outer side of housing 40 adjacent to an axial bottom end thereof. A number of end cover fixing posts 102 with through holes are correspondingly formed on the periphery of the end cover 100. Fasteners such as screws or the like pass the through holes of the lower fixing post 413 and the through holes of the end cover fixing post 102 to fix the end cover 100 to the housing 40. A number of upper fixing posts 414 with through holes are formed on the outer side of housing 40 adjacent to an axial top end thereof. The flange 62 of the sleeve 60 and the pump casing 10 are respectively provided with a plurality of sleeve fixing posts 624 with through holes and a plurality of pump casing fixing column 14 with through hole. Fasteners such as screws sequentially pass the through holes of the pump casing fixing posts 14, the sleeve fixing posts 624, and the upper fixing posts 414 to fixedly connection of the sleeve 60, the housing 40, and the pump casing 10 for completely assembly of the present embodiment of the fluid pump. Preferably, a sealing ring 15 can also be provided between the pump casing 10 and the flange 62 of the sleeve 60 to improve the connection and sealing between the two and prevent the liquid in the pump chamber 11 from seeping out.

Although the invention is described with reference to one or more preferred embodiments, it should be appreciated by those skilled in the art that various modifications are possible. Therefore, the scope of the invention is to be determined by reference to the claims that follow.

The invention claimed is:

1. A fluid pump comprising
a pump casing;
a motor connected to the pump casing, and comprising a housing and a stator arranged in the housing, the housing being made of a non-magnetic material, the stator comprising a stator iron core and a plurality of windings wound on the stator iron core, and;
an impeller driven by the motor;
wherein the motor further comprises a sleeve arranged in the housing, and the sleeve comprises a cylindrical main body and a flange extending radially outwards from one end of the main body, the flange is fixed to the housing, an annular space is jointly bounded by the sleeve and the housing to accommodate the stator, a part of inner surface of the housing and a part of bottom surface of the flange facing the annular space are coated with a metal coating for electromagnetic wave shielding;
wherein the metal coating comprises a copper layer and two nickel layers respectively located on opposite sides of the copper layer.

2. The fluid pump according to claim 1, wherein the main body of the sleeve is surrounded by the stator, and a part of a side wall of the main body facing the annular space is partially coated with the metal coating.

3. The fluid pump according to claim 1, wherein the housing includes a cylindrical side wall and a partition wall extending inwards from the side wall to divide a space inside the housing to a first accommodating chamber and a second accommodating chamber, the stator and the sleeve are both received in the first accommodating chamber, and an inner surface of the side wall of the housing and an end surface of the partition wall facing the annular space are coated with the metal coating.

4. The fluid pump according to claim 3, wherein the partition wall is provided with an avoidance hole, a hole wall bounding the avoidance hole is covered by the metal coating.

5. The fluid pump according to claim 3, wherein the motor further comprises a terminal arranged in the housing, and the terminal is used to ground the stator core.

6. The fluid pump according to claim 1, wherein the casing is made of plastic, and the metal coating is formed by physical vapor deposition.

7. The fluid pump according to claim 1, wherein one the one of the nickel layers is directly laminated onto surfaces of the housing or the sleeve, the copper layer is laminated onto said one of the nickel layers, the other nickel layer is laminated at the top of metal coating, the metal coating has at least one silver layer laminated between the copper layer and the nickel layer at the top of the metal coating.

8. The fluid pump according to claim 1, wherein the thickness of the metal coating is range between 0.5 to 1.5 um.

* * * * *